(12) United States Patent
Yukawa

(10) Patent No.: US 8,281,834 B2
(45) Date of Patent: Oct. 9, 2012

(54) ASSEMBLY OF PNEUMATIC TIRE, NOISE DAMPER, AND RIM

(75) Inventor: Naoki Yukawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 345 days.

(21) Appl. No.: 12/652,595

(22) Filed: Jan. 5, 2010

(65) Prior Publication Data

US 2010/0108223 A1    May 6, 2010

Related U.S. Application Data

(62) Division of application No. 11/634,845, filed on Dec. 7, 2006, now Pat. No. 7,743,808.

(30) Foreign Application Priority Data

Dec. 8, 2005 (JP) ................................ 2005-355129
Dec. 13, 2005 (JP) ................................ 2005-359333

(51) Int. Cl.
*B60C 5/00* (2006.01)
*B60C 19/00* (2006.01)
*B60B 21/00* (2006.01)
*B60B 21/12* (2006.01)

(52) U.S. Cl. ....................................... 152/450; 152/157

(58) Field of Classification Search .................. 152/450, 152/157
See application file for complete search history.

(56) References Cited

U.S. PATENT DOCUMENTS

| | | | |
|---|---|---|---|
| 7,455,092 B2 | 11/2008 | Yukawa et al. | |
| 2005/0098251 A1 | 5/2005 | Yukawa | |
| 2007/0131326 A1 | 6/2007 | Yukawa et al. | |
| 2007/0131327 A1 | 6/2007 | Yukawa et al. | |

FOREIGN PATENT DOCUMENTS

| | | |
|---|---|---|
| EP | 1 659 004 | 5/2006 |
| JP | 2003-252003 A | 9/2003 |
| JP | 2005-138760 A | 6/2005 |

*Primary Examiner* — Adrienne C Johnstone
(74) *Attorney, Agent, or Firm* — Birch, Stewart, Kolasch & Birch, LLP

(57) ABSTRACT

A pneumatic tire and rim assembly is provided in the cavity with a noise damper in which a sponge material extending in a circumferential direction of the tire and having a volume V2 of 0.4 to 20% of entire volume V1 of the cavity, wherein the noise damper comprises a fixing surface fixed to a surface which surrounds the tire cavity, and a free surface directed to the tire cavity, a maximum value of thickness from the fixing surface to the free surface is in a range of 5 to 50 mm, including a thick mountain portion and a thin valley portion; and at least one of outer ends of the noise damper in the circumferential direction of the tire is formed into an inclined surface portion comprising a first inclined surface rising from the fixing surface and a second inclined surface extending from the first inclined surface to the free surface.

4 Claims, 10 Drawing Sheets

ND RIM

This application is a Divisional of application Ser. No. 11/634,845 filed on Dec. 7, 2006, now U.S. Pat. No. 7,743,808 issued on Jun. 29, 2010, the entire contents of which are hereby incorporated by reference and for which priority is claimed under 35 U.S.C. §120. This nonprovisional application also claims priority under 35 U.S.C. §119(a) on Patent Application Nos. 2005-355129 and 2005-359333 filed in Japan on Dec. 8, 2005 and Dec. 13, 2005, respectively, the entirety of which is herein incorporated by reference.

BACKGROUND OF THE INVENTION

The present invention relates to an assembly of a pneumatic tire and a rim in which a noise damper made of sponge material is disposed in a tire cavity, thereby reducing a road noise during running.

To reduce a road noise during running, Japanese Examined Patent Application Publication No. 3612059 and Japanese Published Patent Application No. 2005-138760 propose to dispose a noise damper comprising a long band-like sponge material extending in a circumferential direction of a tire in a tire cavity. Thereby, energy of resonance vibration of air (cavity resonance) of air generated in the tire cavity can be absorbed and moderated by the noise damper.

The noise damper is formed by fixing a bottom surface of the noise damper to a cavity surface on the side of the tire or on the side of the rim. This prevents the noise damper from moving in the tire cavity and rubbing against the tire cavity surface, prevents the noise dampers from rubbing against each other, and prevents the tire and the noise damper from being damaged.

In the noise damper, a stress acting during running is prone to concentrate on an outer end of a fixing surface (bottom surface) in the circumferential direction of the tire. Therefore, there is a tendency that a crack and damage are prone to be generated in the sponge material in the vicinity of the outer end of the fixing surface.

As an output of a vehicle is improved and the length of the expressway is increased, there is a tendency that the average running speed of vehicles is also increased, and a large force is prone to be applied to a noise damper fixed to a cavity surface of a tire. Especially, external forces in various directions are applied to the noise damper when the vehicle runs, brakes and/or turns. Therefore, in the case of a pneumatic tire having such a noise damper, it is necessary to enhance the durability of the noise damper so that it can withstand a long term use.

In an assembly of a tire and a rim having a noise damper, it is necessary to reduce a stress concentration at outer ends and corners of various parts of the noise damper and to enhance the durability without deteriorating the road noise reducing effect.

In the noise damper a (symbols are shown in FIG. 10), to enhance the adhering operation efficiency to a tire, when the noise damper a is to be produced, a double-faced tape is pasted on a bottom surface as in some cases. However, when the noise damper a to which the double-faced tape is pasted is packed in a box and transported from a producing factory to a tire producing factory, the noise damper a is deviated in position in the box by vibration and acceleration at the time of transportation. Further, the outer end e (the end of the length direction) is prone to collide against a wall surface of the box. At that time, a double-faced tape at the outer end is crushed, the double-faced tapes are adhered to each other, a peeling off paper is peeled off and the adhering surface is deteriorated and the adhering strength is deteriorated.

As a result, when a tire to which such a noise damper a is adhered is used, the adhered portion of the noise damper a is peeled off from the tire, starting at the outer end b. Thus, there is a problem that the durability of the noise damper and the durability of the tire are deteriorated. Also, an outer appearance of the tire is also deteriorated.

It is necessary to reduce a mass of at least one of the outer ends ae of the noise damper, to reduce a stress applied to the fixing surface, and to suppress the crack or damage. Thus, as shown in FIG. 10, the Japanese Published Patent Application No. 2005-138760 proposed that both outer ends ae of the noise damper a in the circumferential direction of the tire are formed into inclined surface portions having acute tip ends.

BRIEF SUMMARY OF THE INVENTION

It is a main object of the present invention to provide an assembly of a tire and a rim which is capable of enhancing its durability without deteriorating a road noise reducing effect.

The present invention can provide a pneumatic tire having a noise damper capable of reducing stress concentration of the noise damper by providing thick mountain portions and a thin valley portion located between the mountain portions.

The present invention has a common structure which is an assembly of a pneumatic tire and a rim, comprising a noise damper in which a sponge material extending in a circumferential direction of the tire and having a volume V2 of 0.4 to 20% of entire volume V1 of a tire cavity formed by a rim and a pneumatic tire assembled to the rim is used in the cavity, the noise damper comprises a fixing surface fixed to a surface which surrounds the tire cavity, and a free surface directed to the tire cavity, a maximum value of thickness from the fixing surface to the free surface is in a range of 5 to 50 mm, including a thick mountain portion and a thin valley portion, at least one of outer ends of the noise damper in the circumferential direction of the tire is formed into an inclined surface portion.

A invention is characterized in which the inclined surface portion comprising a first inclined surface rising from the fixing surface and a second inclined surface extending from the first inclined surface to the free surface, an inclination angle $\theta 1$ formed between the first inclined surface and the fixing surface is in a range of 60 to 120 degrees, and an inclination angle $\theta 2$ formed between the second inclined surface and the fixing surface is in a range of 15 to 70 degrees and is smaller than the inclination angle $\theta 1$.

Another one is characterized in which the free surface of the noise damper is corrugated in a substantially trapezoidal wave form whose corner is chamfered by an arc having a radius of curvature of 2.0 to 10.0 mm in a widthwise direction, forming at least two mountain portions and the valley portion therebetween.

In this specification, the "volume V2" of the noise damper is an apparent entire volume of the noise damper, and is a volume defined from an outer shape of the noise damper having inside bubbles.

The "entire volume V1 of tire cavity" is approximately obtained by the following equation in a non-load state in which normal internal pressure is charged into the assembly.

$$V1 = A \times \{(Di-Dr)/2+Dr\} \times p$$

wherein, "A" is a tire transverse cross sectional area of the tire cavity i obtained by CT scanning an assembly of the tire and the rim in the normal state, "Di" is a maximum outer diameter of the tire cavity surface 2*i* in the normal state, "Dr" is a rim diameter, and "p" is a Ludolphian number.

The "normal internal pressure" is air pressure determined for each tire in each standard in a standard system including one on which a tire is based, and is a maximum air pressure in the case of JATMA, a maximum value described in "TIRE LOAD LIMITS AT VARIOUS COLD INFLATION PRESSURES" in the case of TRA, and "INFLATION PRESSURE" in the case of ETRTO. When the tire is for a passenger vehicle, the normal internal pressure is 200 kPa uniformly while taking the using frequency into consideration.

BRIEF DESCRIPTION OF THE SEVERAL VIEWS OF DRAWINGS

DETAILED DESCRIPTION OF THE INVENTION

Figure 1:
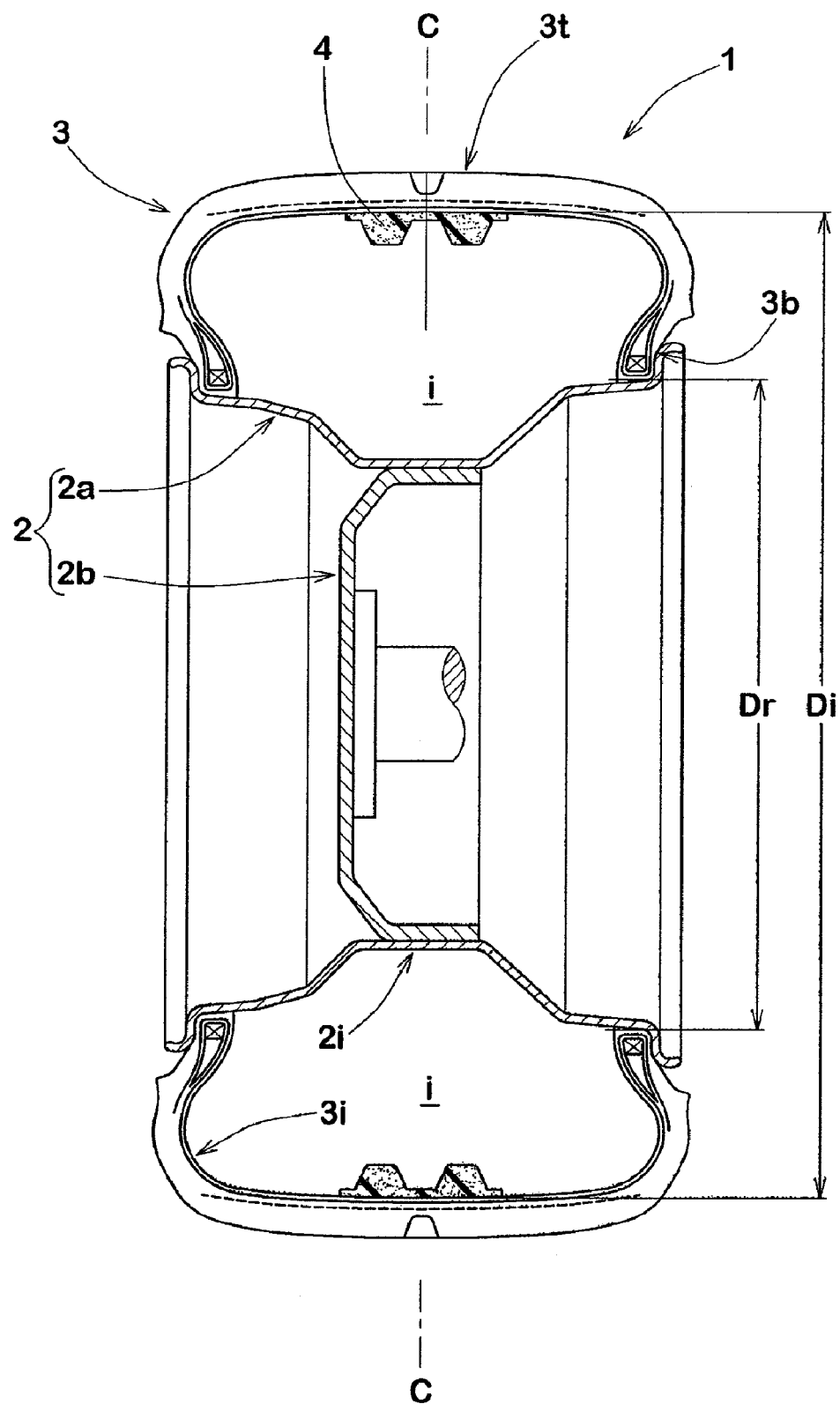
FIG. 1 is a meridian sectional view showing an embodiment of an assembly of a pneumatic tire and a rim of the present invention.

An embodiment of the present invention will be explained based on the drawings. As shown in FIG. 1, an assembly 1 of a pneumatic tire and a rim includes a pneumatic tire (simply "tire", in some cases) 3, and a noise damper 4 fixed in a tire cavity i surrounded by the rim 2 and the tire 3.

The rim 2 includes an annular rim main body 2*a* which places a bead portion 3*b* of the tire 3, and a disk 2*b* in a circle which fixes the rim main body 2*a* to an axle. As the rim 2, a normal rim defined in the standard such as JATMA can be employed.

Figure 3:
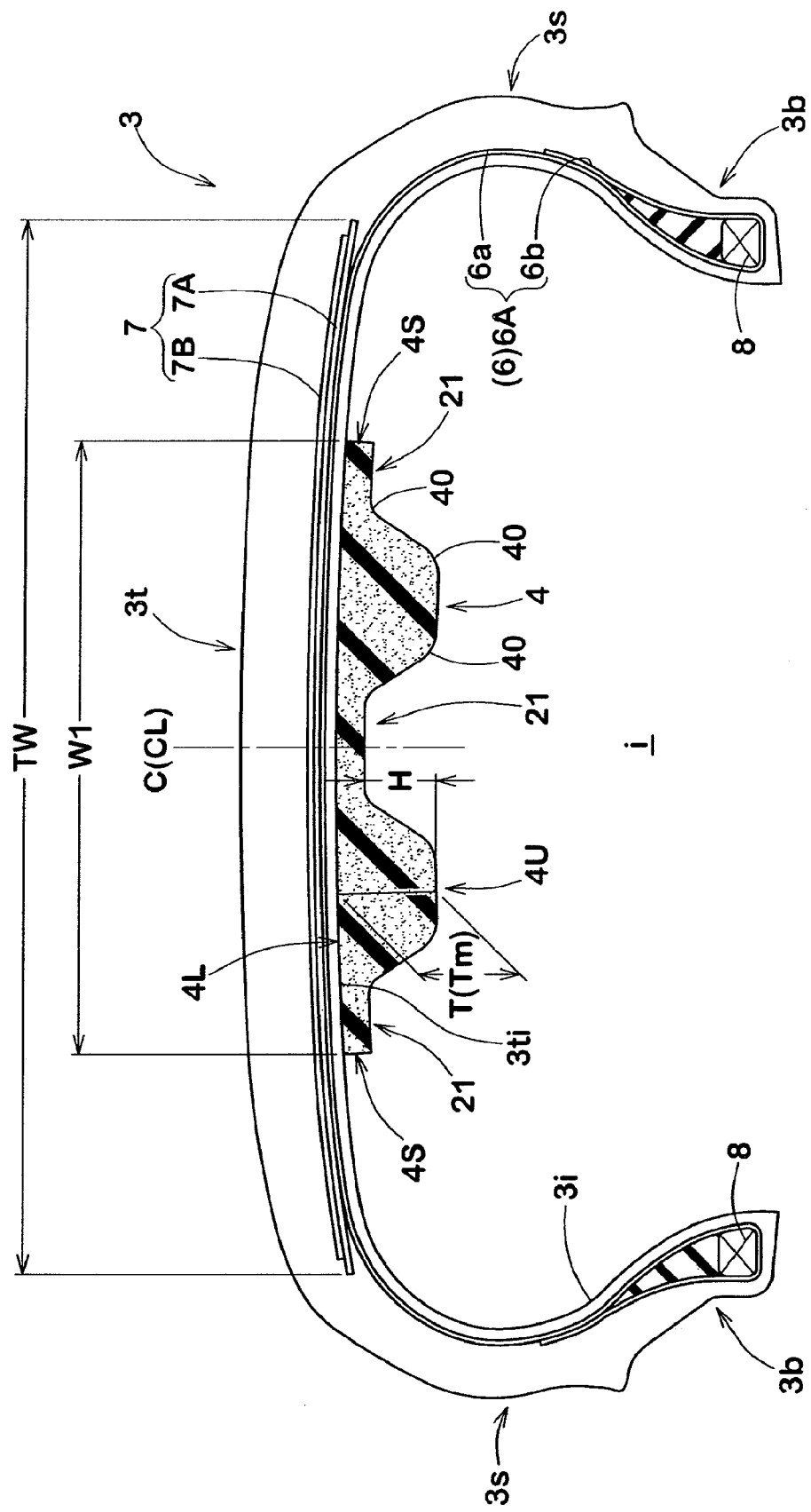
FIG. 3 is a meridian sectional view showing the pneumatic tire.

The tire 3 is a tubeless tire. As shown in FIG. 3, the tire 3 includes a tread portion 3*t*, a pair of sidewall portions extending from opposite ends of the tread portion 3*t* radially inward of the tire, and bead portions 3*b* located on inner ends of the sidewall portions 3*s*. A tire inner surface 3*i* is covered with an inner liner made of low air-permeability rubber. With this, an air-tight tire cavity i is formed by the tire inner surface 3*i* and the rim inner surface 2*i*. The tire 3 is not limited to an internal structure or categories, and various tires can be adopted. However, as a tire, a passenger vehicle tire which strongly requires silence in a passenger room, especially as a passenger vehicle radial tire having an aspect ratio of 50% or less is preferably adopted.

The tire 3 is reinforced by a carcass 6 extending between the bead portions 3*b* and 3*b*, and a belt layer 7 disposed radially outside of the carcass 6 and in the tread portion 3*t*.

The carcass 6 is formed of one or more (one, in this embodiment) carcass ply 6A in which organic fiber cords are disposed at an angle of 70 to 90 degrees with respect to the circumferential direction of the tire. Both ends of the carcass 6 are folded back around the bead core 8. The belt layer 7 is formed of a plurality of (two, in this embodiment) belt plies 7A and 7B in which steel cords are arranged at an angle of 10 to 40 degrees or 10 to 30 degrees with respect to the circumferential direction of the tire. The steel cords are intersecting with each other between the plies so that the belt rigidity of the belt layer 7 is enhanced. A known band layer may be provided outside of the belt layer 7 if necessary. The structure of the tire 2 can appropriately be changed if necessary or based on categories of the tire.

Next, the noise damper 4 is made of a long band-like sponge material extending in the circumferential direction of the tire. The noise damper 4 is adhered to a tire-side cavity surface which is the tire inner surface 3*i*, or a rim-side cavity surface which is the rim inner surface 2*i*. The noise damper 4 is adhered and fixed in the circumferential direction of the tire using a double-faced tape 11 (double-faced tape=tape having adhesive on both surfaces). This prevents the noise damper 4 from freely moving in the tire cavity during running, and prevents the noise damper 4 from being damaged, and resonance suppressing effect can stably be exhibited. It is preferable that the noise damper 4 is adhered to the tire inner surface 3*i*, especially tread inner surface 3*ti* in view of rim-assembling properties. The tread inner surface 3*ti* means an inner surface of the tread portion 3*t* which comes into contact with a road surface. In this specification, the tread inner surface 3*ti* includes a width region TW in the axial direction of a tire where at least the belt layer 7 is disposed. As an especially preferable example, the noise damper 4 is mounted such that its widthwise center is located on a tire equator C.

By adhering the tread inner surface 3*ti* in this manner, a centrifugal force at the time of high speed running is directed radially outward. Therefore, it is possible to effectively pushes the noise damper 4 against the tread inner surface 3*ti* utilizing the centrifugal force, and its motion can be restrained.

Figure 2:
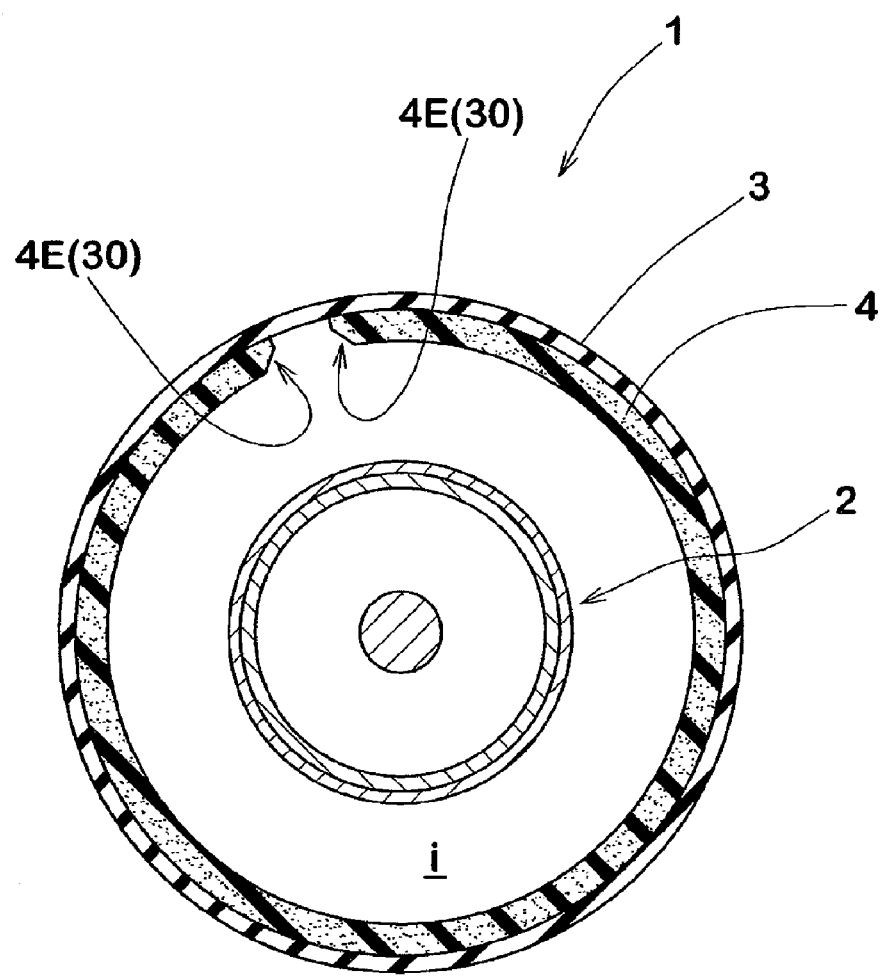
FIG. 2 is a sectional view of the assembly in a circumferential direction.

The noise damper 4 has substantially a constant cross section shape and extends in the circumferential direction of the tire. Here, the reason whey the noise damper 4 has "substantially" the constant cross section shape is that the thickness is varied by the inclined surface portions 30 formed on both ends 4E in the circumferential direction, to enhance the durability, as shown in FIG. 2.

The sponge material forming the noise damper 4 is a spongy porous structure, and is a sponge having continuous bubbles made of rubber or synthetic resin, or web formed by twining and integrally connecting animal fiber, plant fiber and synthetic fiber. Further, not only the continuous bubbles but also independent bubbles are included in the "porous structure".

It is possible to preferably use synthetic resin sponge such as ether-based polyurethane sponge, ester-based polyurethane sponge, polyethylene sponge; and rubber sponge such as chloroprene rubber sponge (CR sponge), ethylene propylene rubber sponge (EDPM sponge), and nitrile rubber sponge (NBR sponge). Among them, polyurethane sponge, especially ether-based polyurethane is preferable in terms of noise damping ability, light in weight, adjusting properties of bubble and durability. A continuous bubble sponge material made of polyurethane is used as the noise damper 3 of the embodiment.

According to such a sponge material, a surface and/or an inside porous portion converts vibration energy of air into thermal energy and consumes the energy, sound (cavity resonance energy) in the tire cavity i is reduced and a road noise is reduced. Since it is easy to deform (shrink, bend) the sponge material, the sponge material does not substantially affects the deformation of the tire during running. Therefore, it is possible to prevent the steering stability from being deteriorated. The sponge material has extremely small specific gravity as compared with solid rubber, and it is possible to prevent weight balance of a tire from being deteriorated.

If the specific gravity of the sponge material is too high, the weight of a tire is increased, and if the specific gravity is too low, sufficient strength cannot be obtained, and the cavity resonance suppressing effect is deteriorated. In view of the above point, it is preferable that a lower limit of the specific gravity of the sponge material is 0.005 or higher, and more preferably 0.01 or higher. It is preferable that the upper limit value of the specific gravity is 0.06 or lower, 0.04 or lower and 0.03 or lower. The specific gravity of the noise damper 4 is usually selected from a range of 0.014 to 0.052.

It is preferable that the noise damper 3 is a sponge having hardness in a range of 80 to 150 N, and tensile strength in a range of 120 to 160 kPa.

When the hardness is limited, appropriate elongation is secured for the noise damper 3. This elongation is useful in widely dispersing stress when distortion occurs in the noise damper 3. It is especially preferable that the hardness of the sponge material is 90 N or more, and its upper limit is 130 N or less and more preferably, 110 N or less.

When the tensile strength of the sponge material is limited, the strength against the stress is further enhanced. It is especially preferable that the tensile strength of the sponge material is 130 kPa or more, and the upper limit is not especially limited, but a preferable upper limit is 150 kPa or less in terms of cost, productivity, available easiness on the market.

In this specification, the hardness of the sponge material is a value as measured in accordance with A method (6.3) of a measuring method of "hardness" in paragraph 6 defined in "soft polyurethane foam test method" of JIS K6400.

The tensile strength of the sponge is a value as measured with respect to a type-1 dumbbell test piece in accordance "tensile strength and elongation" in paragraph 10 of JIS.

When high pressure air is charged into the tire cavity i using a compressor, water (moisture) included in the air may enter the tire cavity i. For this reason also, ether-based polyurethane sponge which is strong against hydrolytic degradation is suitable as the sponge material. It is preferable that the sponge material has repellency so that water does not infiltrate inside the sponge material when the sponge material gets wet. To prevent mildew from generating due to moisture, it is also preferable that the sponge material has anti-mildew properties. To lower the exhaust gas toxicity when discarded tires are burned, it is especially preferable to form sponge material of material having no halogen atoms.

The volume V2 of the noise damper 4 is set to in a range of 0.4 to 20% of the entire volume V1 of the tire cavity i. If the ratio of the volume V2 of the noise damper 4 to the entire volume V1 of the tire cavity i is 0.4% or more, remarkable road noise reducing effect of about 2 dB or more can be expected.

This noise reduction level can clearly be confirmed in a passenger room. From such a view point, it is preferable that the volume V2 of the noise damper 4 is 1% or more of the entire volume V1 of the tire cavity i, more preferably 2% or more, more preferably 4% or more, more preferably 6% or more, and more preferably 7% or more. If the volume V2 of the noise damper 4 exceeds 20% of the entire volume V1 of the tire cavity i, the road noise reducing effect is not enhanced any more, cost is increased, and the weight balance of the assembly 1 is prone to be deteriorated. From such a view point, it is preferable that the volume V2 of the noise damper 4 is 15% or less of the entire volume V1 of the tire cavity i and more preferably 10% or less.

Here, the "volume of the noise damper" is an apparent entire volume of the noise damper, and is a volume defined from an outer shape of the noise damper having inside bubbles.

The "entire volume of tire cavity" is approximately obtained as the V1 in a non-load state in which the pneumatic tire 2 is assembled to a normal rim (not shown) and normal internal pressure is charged into the assembly.

$$V1 = A \times \{(Di-Dr)/2 + Dr\} \times p$$

wherein, "A" is a tire transverse cross sectional area of the tire cavity i obtained by CT scanning an assembly of the tire and the rim in the normal state, "Di" is a maximum outer diameter of the tire cavity surface 2i in the normal state, "Dr" is a rim diameter, and "p" is a Ludolphian number.

Figure 4:
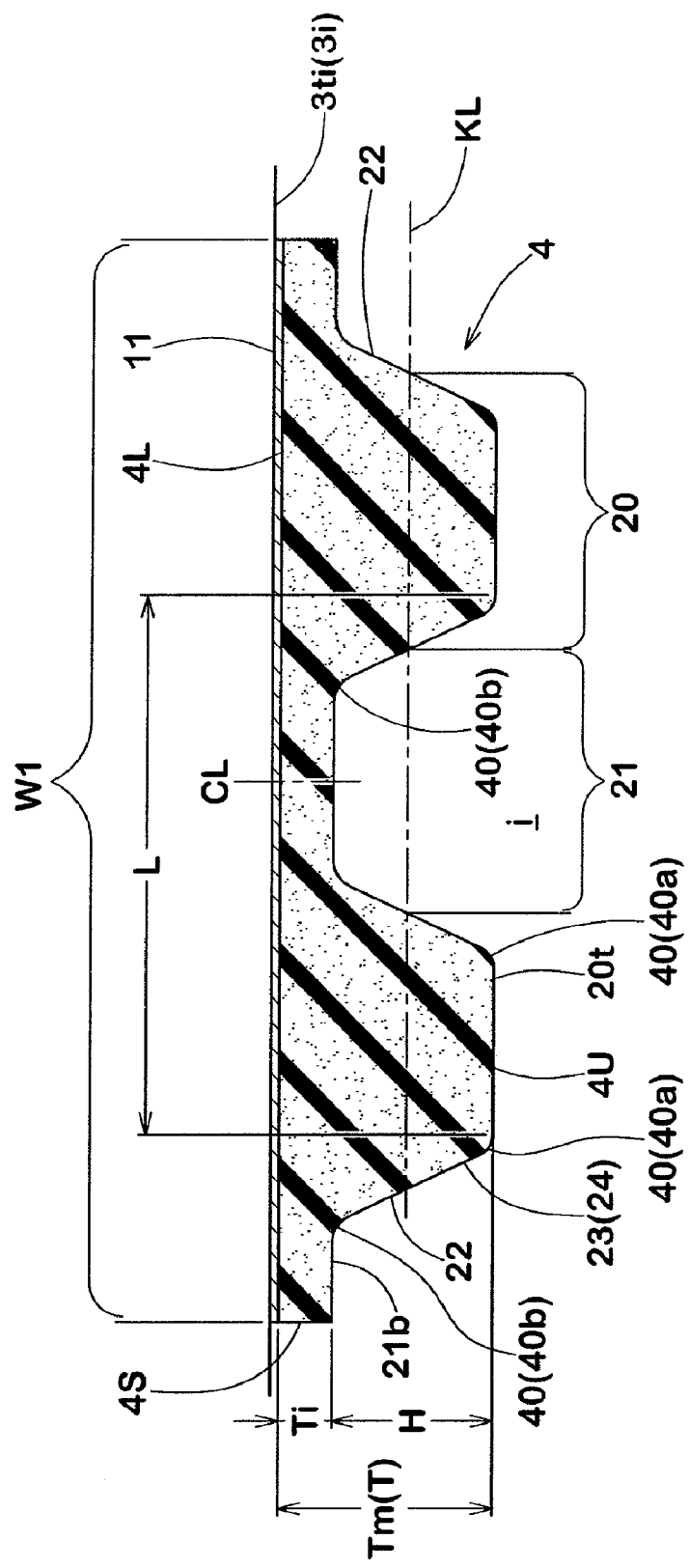
FIG. 4 is a sectional view of a noise damper in its widthwise direction.

Next, a cross section (tire meridian cross section including an axis of the tire) in the widthwise direction of the noise damper 4 is shown in FIG. 4. The noise damper 4 includes a fixing surface 4L which is adhered and fixed to the tread inner surface 3ti, and a free surface 4U directed to a center of the tire cavity i. The maximum value of the thickness T from the fixing surface 4L to the free surface 4U is in a range of 5 to 50 mm. In this embodiment, the noise damper has a laterally long cross section shape in which a width W1 of the fixing surface 4L is greater than the maximum value Tm of the thickness. The maximum value Tm and the width W1 are measured in a state where the noise damper 4 is mounted on the tire 3 and the tire is not yet assembled to the rim (at normal temperature and under normal pressure). The maximum value Tm of the thickness is measured at a direction intersecting with the fixing surface 4L at right angles, and the width W1 is measured along the fixing surface 4L.

It is preferable that the maximum value Tm of the thickness T is 40 mm or less, more preferably 30 mm or less and more preferably 25 mm or less. If the maximum value Tm is excessively large, there is an adverse possibility that the tire lever interferes with the noise damper 4 when the tire is assembled to the rim or the like, as explained using FIG. 6. If the maximum value Tm is excessively small on the other hand, there is an adverse possibility that cavity resonance energy absorbing effect is deteriorated, and it is preferable that the maximum value Tm is 10 mm or more, and more preferably 15 mm or more.

To prevent the tire from laterally falling at the tire cavity i, it is preferable that the width W1 of the noise damper 4 is 20% or more of the width TW of the belt layer 7, more preferably 30% or more, and more preferably 40% or more. It is preferable that its upper limit is 80% or less, more preferably 70% or less and more preferably 65% or less.

Figure 6:
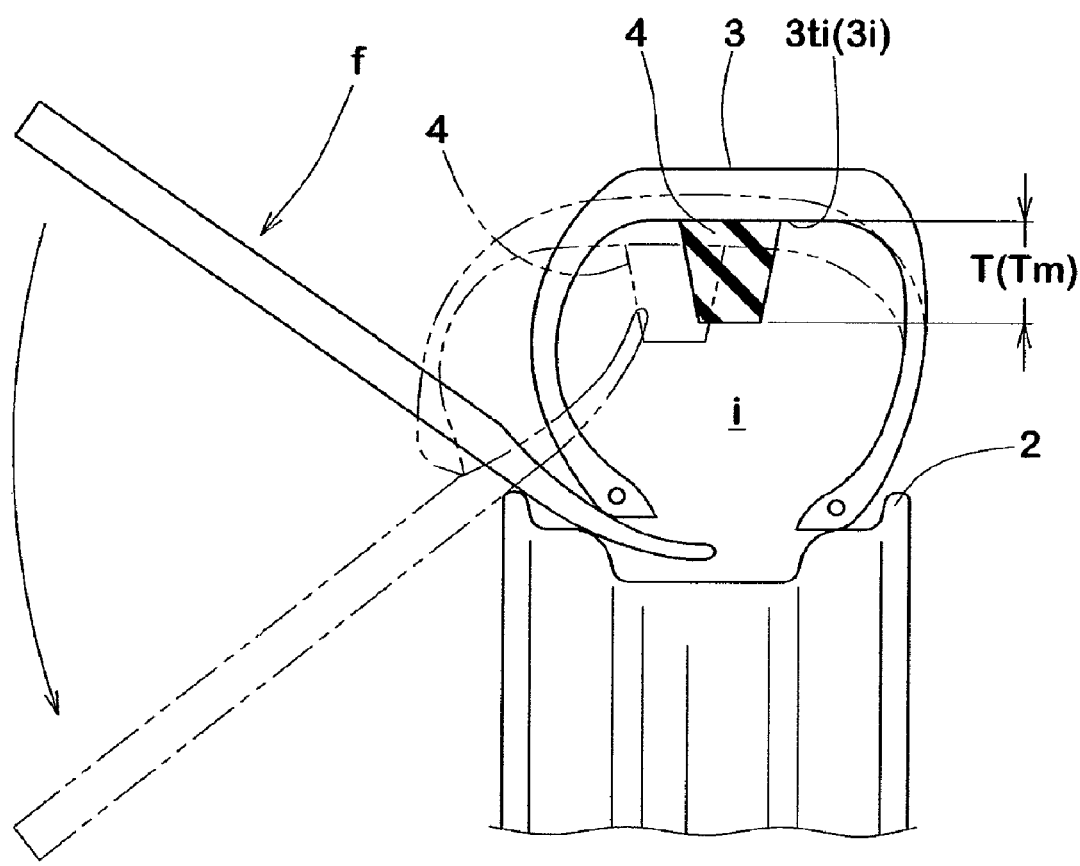
FIG. 6 is a diagram used for explaining a peel test.

The present inventors carried out a tire taking out test concerning assembly in which a noise damper having a rectangular cross section is disposed in a tread inner surface 3ti, and checked a damage state of the noise damper 4. As shown in FIG. 6, the tire taking out test was carried out by a plurality of operators using a tire changer (not shown) and a tire lever f. The operators were not previously informed of the existence of the noise damper. Many kinds of sample assemblies having various noise dampers of different maximum values Tm and different aspect ratios of the tire were used.

When the tire 3 is taken out from the rim 2, the tire lever f is inserted into the tire cavity i. The insertion length is different depending upon the kinds (categories, aspect ratio and the like) of the tire, technique of the operator and habit at the time of operation. As a result of the test, it was found that if the assembly had a noise damper in which the maximum value Tm of the thickness was limited to 5 to 50 mm, the number of damages of the noise damper was reduced. This is because that an operator generally desires to prevent the tire lever f and the tire inner surface 3i from coming into contact with each other and thus, the insertion length of the tire lever f is limited. Therefore, when the noise damper has thin thickness T, it is conceived that the chance of contact is reduced. However, in the case of a flat tire having an aspect ratio of 50% or less, there was a tendency that the tire lever f frequently came into contact with a side surface of the noise damper.

Therefore, the fixing surface 4L is formed with thick mountain portions 20 and a thin valley portion 21. As shown in FIG. 4, each mountain portion 20 includes a crest 20t in which the thickness T is the maximum value Tm. In this embodiment, the valley portion 21 has valley bottoms 21b which are located on opposite sides of the mountain portion 20 and its thickness T is a minimum value Ti. That is, the free surface 4U is formed of a corrugated curved line 24 in which a wave element 23 is repeated in the widthwise direction. The wave element 23 includes the crest 20t, a valley bottom 21b, and inclined portions 22 extending from the crest 20t to the valley bottoms 21b. The noise damper 4 forms the minimum value Ti on opposite ends of the free surface 4U in the widthwise direction. The minimum value Ti is limited to a range of 1.0 to 15 mm.

That is, the free surface 4U extends along the corrugated curved line 24, and the thick mountain portion 20 and the thin valley portion 21 are alternately formed in the noise damper 4. In this embodiment also, both ends of the noise damper 4 are terminated at the valley portions 21 of the noise damper 4 in the widthwise direction, and the thicknesses of the both ends in the widthwise direction are minimum values Ti. When an amplitude center line KL of the corrugated curved line 24 is a reference thickness, the mountain portion 20 can be defined as being thicker than the amplitude center line KL. The valley portion 21 can be defined as being thinner than the amplitude center line KL.

Since the both ends of the noise damper 4 in the widthwise direction are formed in this manner, contact between the tire lever f and the noise damper 4 is avoided more reliably. The inclined portion 22 is close to an arc locus formed by a tip end of the tire lever f. Therefore, even when the tire lever f comes into contact with the noise damper 4, a friction force between the tire lever f and the inclined portion 22 is small. As a result, the tip end of the tire lever f does not bite into the noise damper 4 easily. By the interaction, it is possible to effectively prevent the noise damper 4 from being damaged, and to prevent the noise damper 4 from being peeled off from the tire 3.

In this embodiment, the noise damper 4 has the two mountain portions 20. With this, since the surface area of the free surface 4U is increased, higher resonance suppressing effect can be exhibited. Since the valley portion 21 is formed between the mountain portions 20, when the tire lever f comes into contact with the inclined portion 22, the mountain portion 20 can easily deform inward in the widthwise direction, and it is possible to further prevent the tire lever f from biting. Also, since the valley portion 21 exhibits the heat radiation effect, this is useful in preventing the noise damper 4 from being thermally destroyed.

The number of the mountain portions 20 may be one. Although it is preferable that the corrugated curved line 24 is of trapezoidal shape comprising straight lines as in this embodiment in terms of productivity, but the corrugated curved line 24 may be of sine corrugated curved line. Further, in the corrugated curved line 24, if its amplitude H is too small, the surface area of the free surface 4U becomes small, the resonance suppressing effect in the tire cavity i is prone to be reduced, and if the surface area is too large, the gradient of the inclined portion 22 becomes abrupt, and the damage preventing effect of the noise damper 4 is deteriorated. From such a view point, it is preferable that the lower limit of the amplitude H is 4 mm or more, 8 mm or more, and more particularly 10 mm or more, and the upper limit is preferably 44 mm or less, 40 mm or less, 35 mm or less and more particularly 30 mm or less. Preferably it is 20% or more of the maximum value Tm and more preferably 30% or more, and its upper limit is 95% or less, 90% or less and more preferably 80% or less.

Figure 7A:
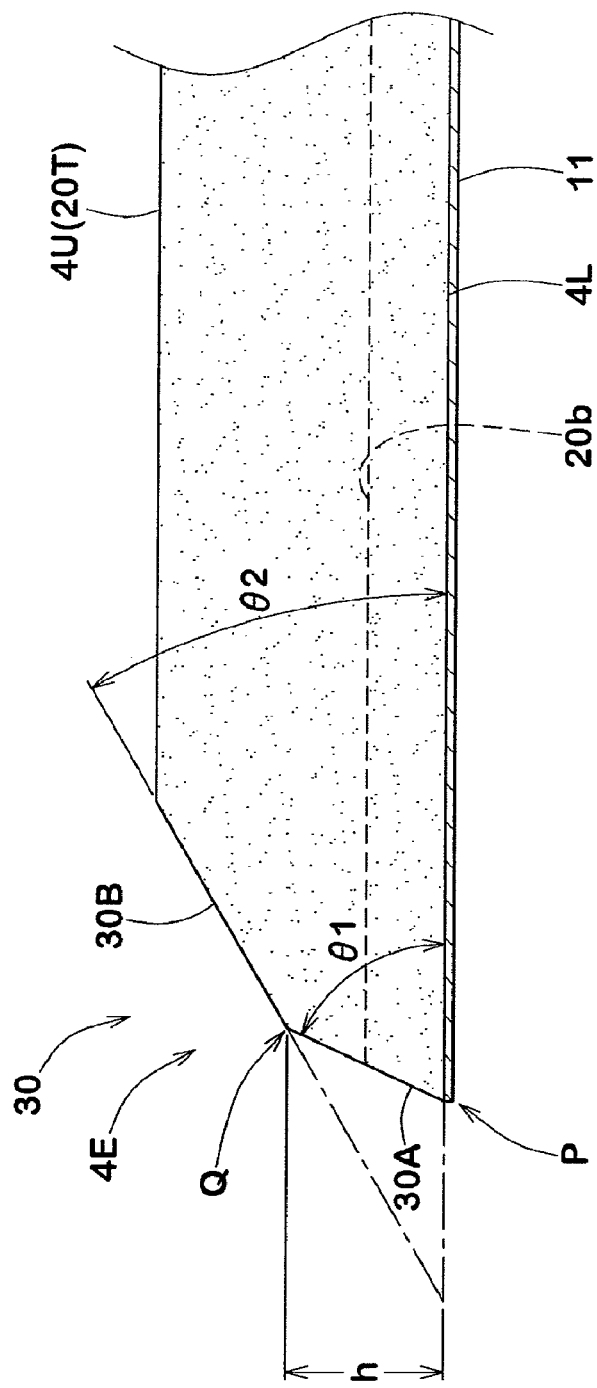
FIG. 7 (A) is a sectional view of an inclined surface portion of an outer end of the noise damper in the circumferential direction having two stage shape at the maximum thickness position.
FIG. 7(B) is a sectional view of another inclined surface shape.

As shown in FIGS. 7(A),(B) in the enlarged scale, the outer end 4E of the noise damper 4 is provided with the inclined surface portion 30. This suppresses a crack and damage of a sponge material generated along the fixing surface 4L. It is conceived that the crack and damage are caused when a stress caused by acceleration applied to the noise damper 4 during running concentrates on the fixing surface of the outer end 4E in the circumferential direction. Therefore, if a mass itself of the outer end 4E is reduced by forming the inclined surface portion 30, a force generated by the acceleration can be reduced, and it is possible to prevent a crack and damage from being generated.

As shown in FIG. 7(A), the inclined surface portion 30 includes a first inclined surface 30A rising from the fixing surface 4L, and a second inclined surface 30B extending from the first inclined surface 30A to the free surface 4U. The inclination angle θ1 formed between the first inclined surface 30A and the fixing surface 4L is in a range of 60 to 120 degrees. The inclination angle θ2 formed between the second inclined surface 30B and the fixing surface 4L is in a range of 15 to 70 degrees and smaller than the inclination angle θ1. Since the inclined surface portion 30 includes the second inclined surface 30B having the small and gentle gradient of inclination angle θ2, it is possible to reduce the mass of the outer end 4E and to suppress the crack and damage.

To enhance the efficiency of the adhering operation to the tire 3, the noise damper 4 is produced in a state where the double-faced tape 11 is pasted on the fixing surface 4L. The produced noise damper having a double-faced tape is packed in a box and transported from a producing factory to a tire producing factory by a truck. The noise damper 4 is deviated in position in the box by vibration and acceleration at the time of transportation, and the tip end P intersecting with the inclined surface portion 30 and the fixing surface 4L is prone to collide against an inner wall surface of the box. When the tip end P is largely deformed at the time of collision, the double-faced tape 11 is crushed at the tip end P and is slightly curled. The double-faced tapes 11 are adhered to each other, the peeling off paper is peeled off and the adhesive surface is deteriorated.

As a result, the adhered portion of the noise damper 4 is peeled off from the tire 3 from the tip end P as a starting point, and there is a problem that the durability of the noise damper 4 and the durability of the tire 3 are deteriorated.

Whereas, in the inclined surface portion 30 of the embodiment has the first inclined surface 30A, the large inclination angle θ1 and abrupt gradient is interposed between the second inclined surface 30B and the fixing surface 4L. Thus, the tip end P can be strong, and it is possible to avoid a case where the tip end P is deformed at the time of transportation, i.e., the double-faced tape 11 is crushed at the tip end P and the tape is slightly curled. It is possible to avoid the trouble in which double-faced tapes 11 adhere to each other, and the peeling off paper is peeled off. It is possible to avoid deterioration in adhering force to the tip end P and deterioration of appearance which may be caused by the deformation.

If the inclination angle θ1 is less than 60 degrees, the deformation preventing effect at the tip end P can not be exhibited. If the angle exceeds 120 degrees, the weight of the inclined surface portion 30 is not reduced, and the crack/damage suppressing effect near the fixing surface 4L is insufficient. Therefore, the lower limit of the inclination angle θ1 is preferably 70 degrees or more and more preferably 80 degrees or more, and the upper limit is preferably 110 degrees or less and more preferably 100 degrees or less.

If the inclination angle θ2 is less than 15 degrees, the amount of sponge in the inclined surface portion 30 is too small, and the road noise reducing effect is deteriorated. If the angle exceeds 70 degrees, the crack and damage suppressing effect is insufficient. From such a view point, it is preferable that the lower limit of the inclination angle θ2 is 30 degrees or more, and the upper limit is 60 degrees or less, and more preferably 50 degrees or less.

To prevent the tip end P from deforming, it is preferable that a height of an intersection Q between the first inclined surface 30A and the second inclined surface 30B in the radial direction from the fixing surface 4L is in a range of 3 to 15 mm. If the height is less than 3 mm, the deformation preventing effect of the tip end P is insufficient. If the height exceeds 15 mm, the crack and damage suppressing effect is not exhibited. The height h is 80% or less of the maximum value Tm of the thickness.

Figure 8A:
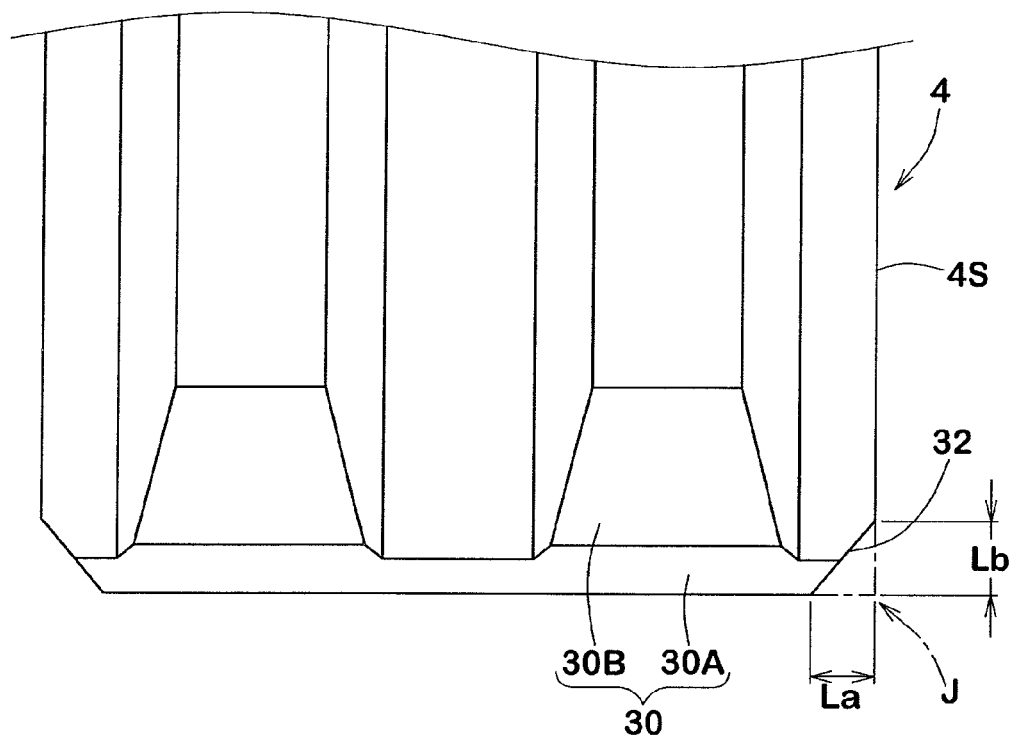
FIG. 8(A) is a plan view of the noise damper showing a chamfered portion.
Figure 8B:
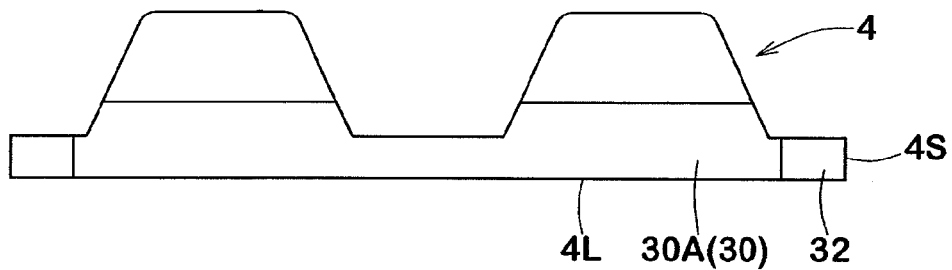
FIG. 8(B) is a front view and FIG. 8(C) is a perspective view.
Figure 8C:
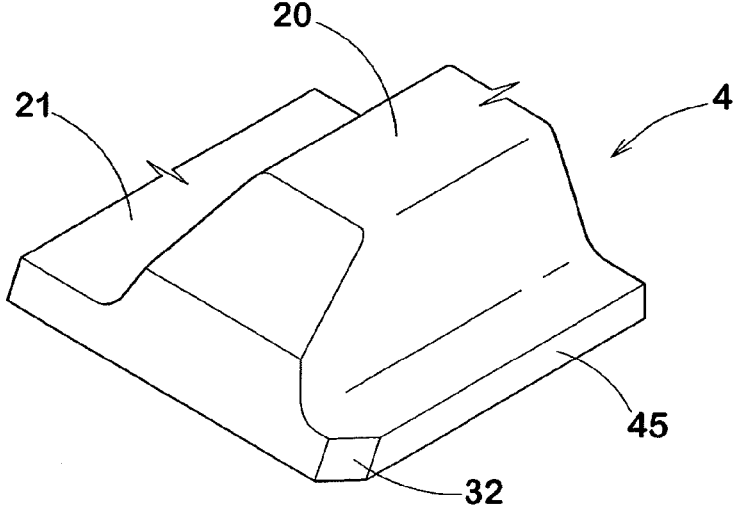

The tip end P is deformed remarkably at an apex J (shown in FIG. 8) at which the side surface 4s of the noise damper 4, the first inclined surface 30A and the fixing surface 4L intersect. Therefore, in the embodiment, a chamfered portion 32 which cuts off the apex J is formed, the deformation of the tip end P is further suppressed. The length La of the chamfered portion 32 and the length Lb of the chamfered portion 32 in the circumferential direction are preferably in a range of 3 to 10 mm. The chamfered portion 32 may be an inclined surface or an arc surface.

Figure 7B:
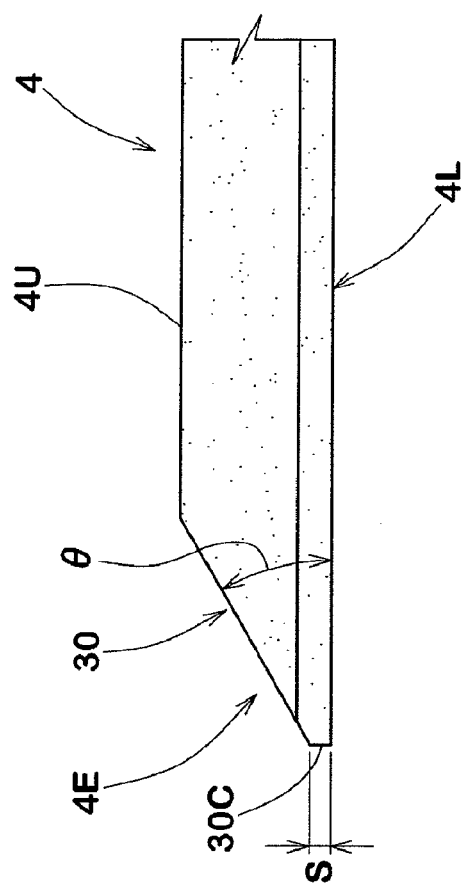

Unlike the embodiment, the inclined surface portion 30 of the outer end 4E in the circumferential direction of the tire can be formed into a tapered shape whose thickness is gradually reduced toward the end in the circumferential direction as shown in FIG. 7(B). An angle θ of the tapered portion between the fixing surface 4L and the free surface 4U is acute. The angle θ is preferably in a range of 15 to 70 degrees. It is preferable that the tip end has an end surface 30C which is cut substantially perpendicularly to the fixing surface 4L. The end surface 30C can effectively enhance the strength of both ends 4E of the noise damper 4, and effectively prevent the noise damper 4 from being cut, splintered and damaged during transportation or storage. The end surface 30C is not especially limited, but the height S of the end surface is preferably 3 mm or more and more preferably 4 mm or more, and the upper limit is 30% or less of the maximum value Tm.

As the double-faced tape, various tapes such as a sheet-like base material such as web is formed at its both surface with adhesive layers, and only an adhesive layer are used. In this embodiment, the former double-faced tape is used.

The double-faced tape is not especially limited, but a tape having tensile strength of 5 (N/10 mm) or more and smaller than 10(N/10 mm) is preferably used. The tensile strength of the double-faced tape is measured in accordance with "test method of tensile strength of adhesive tape" of JISZ0237. For example, it is desired to peel the noise damper 4 from the pneumatic tire 2 to reuse the tire, it is necessary that the double-faced tape 5 itself has tensile strength of certain level. If the tensile strength of the double-faced tape is less than 5 (N/10 mm), there is a tendency that the tape itself is cut when it is peeled off, and the noise damper 4 can not be removed from the cavity surface 2i. If the tensile strength of the double-faced tape becomes equal to or higher than 10 (N/10 mm), cost is increased and this is not suitable for mass production.

Although the double-faced tape noise damper 4 is used in this embodiment, adhesives may be used for the adhering operation.

As the adhesives, solution type adhesives in which synthetic rubber is dissolved in organic solvent, or synthetic rubber-based liquid adhesives such as latex type which is dispersed in water can suitably be used.

As shown in FIG. 4 in the enlarged scale, the free surface 4U of the noise damper 3 has a chamfered portion 40 in which corners are chamfered into arc having radius of curvature of 2.0 to 10.0 mm. The chamfered portion 40 includes an outer chamfered portion 40a at which the crest 20t and the inclined portion 22 intersect with each other, and an inner chamfered portion 40b at which the inclined portion 22 and a valley bottom 21b intersect with each other.

That is, the outer chamfered portion 40a includes a center of the radius of curvature Ra on the side of the noise damper 4. The inner chamfered portion 40b has a center outside of the noise damper 4. The outer chamfered portion 40a includes a center of radius of curvature Rb on the side of the noise damper 4. The inner chamfered portion 40b is provided on each of both sides of the mountain portion 20 in the widthwise direction. The inner chamfered portion 40b is provided on each of both sides of the valley portion 21 (only inner one side of the valley portion 21 of both ends in the widthwise direction).

Since the free surface 4U is formed at its substantially trapezoidal wave form corner with the chamfered portion 40, the stress concentration on each corner is reduced even when the tire receives an external force and distorts. Therefore, initial crack at the corner can be suppressed for a long term, and durability of the noise damper is enhanced.

When the radius of curvature R of the chamfered portion 40 is less than 2 mm, the stress concentration is prone to be generated at an inner corner of the noise damper 4, and the initial crack is prone to be generated. If the radius of curvature R of the chamfered portion 40 exceeds 10 mm, the shape of the noise damper 4 becomes blurred and outward appearance impression is deteriorated. Further, the surface area of the free surface 4U of the noise damper 4 is reduced, and there is a tendency that cavity resonance energy absorbing effect can not sufficiently be obtained. From such a view point, it is preferable that the radius of curvature R is 2.5 mm or more and more preferably 3.0 mm or more, its upper limit is 8.0 mm or less, more preferably 7.0 mm or less and more preferably 6.0 mm.

In this embodiment, a period L of the substantially trapezoidal wave of the free surface 4U is ½ of the width W1 of the noise damper 4 but the invention is not limited to this. The cross section shape of the noise damper 4 is substantially continuous in the circumferential direction of the tire.

Figure 5:
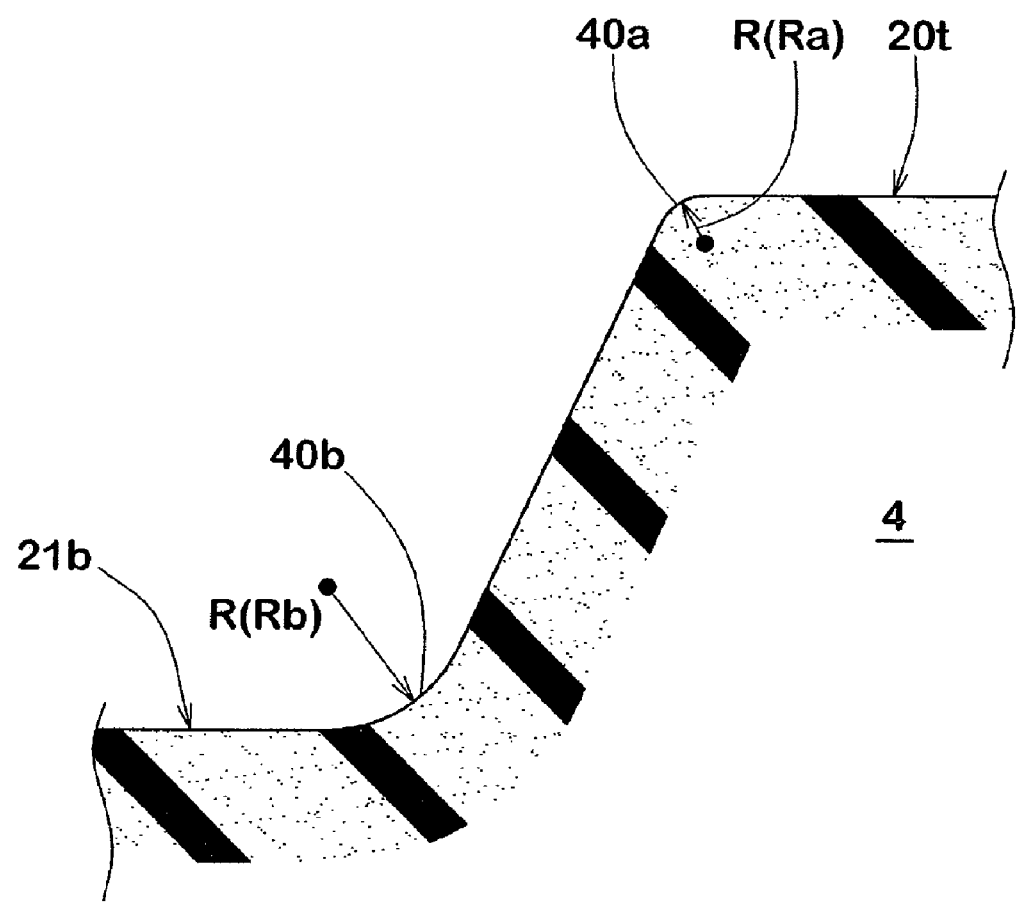
FIG. 5 is an enlarged partially sectional view of the noise damper.

As for the radius R, FIG. 5 shows the radius of curvature Ra of the outer chamfered portion 40a may be smaller than the radius of curvature Rb of the inner chamfered portion 40b. Since the outer chamfered portion 40a projects into the tire cavity i, the outer chamfered portion 40a is able to contact with air in the tire cavity i. However, stress is prone to concentrate on the inner chamfered portion 40b when the noise damper 4 laterally rolls, for example. Therefore, if the radii of curvature are set to Ra<Rb, the road noise reducing effect can be enhanced and the durability of the noise damper 4 can further be enhanced.

A ratio (Ra/Rb) of the radius of curvature Ra of the outer chamfered portion 40a to the radius of curvature Rb of the inner chamfered portion 40b is not especially limited, but if the ratio is too small, the machining properties of the sponge material is deteriorated. If the ratio (Ra/Rb) is too large, the road noise reducing effect is deteriorated, and a crack or the like is prone to be generated in the inner chamfered portion 40b. From such a view point, it is preferable that the ratio (Ra/Rb) is 0.1 or more and more preferably 0.3 or more, and its upper limit is 0.9 or less and more preferably 0.8 or less.

Although the especially preferable embodiment of the present invention has been described in detail, the invention is not limited to the illustrated embodiment and the invention can variously be modified and carried out.

Example 1

(1) Noise Damper Test

Figure 9:
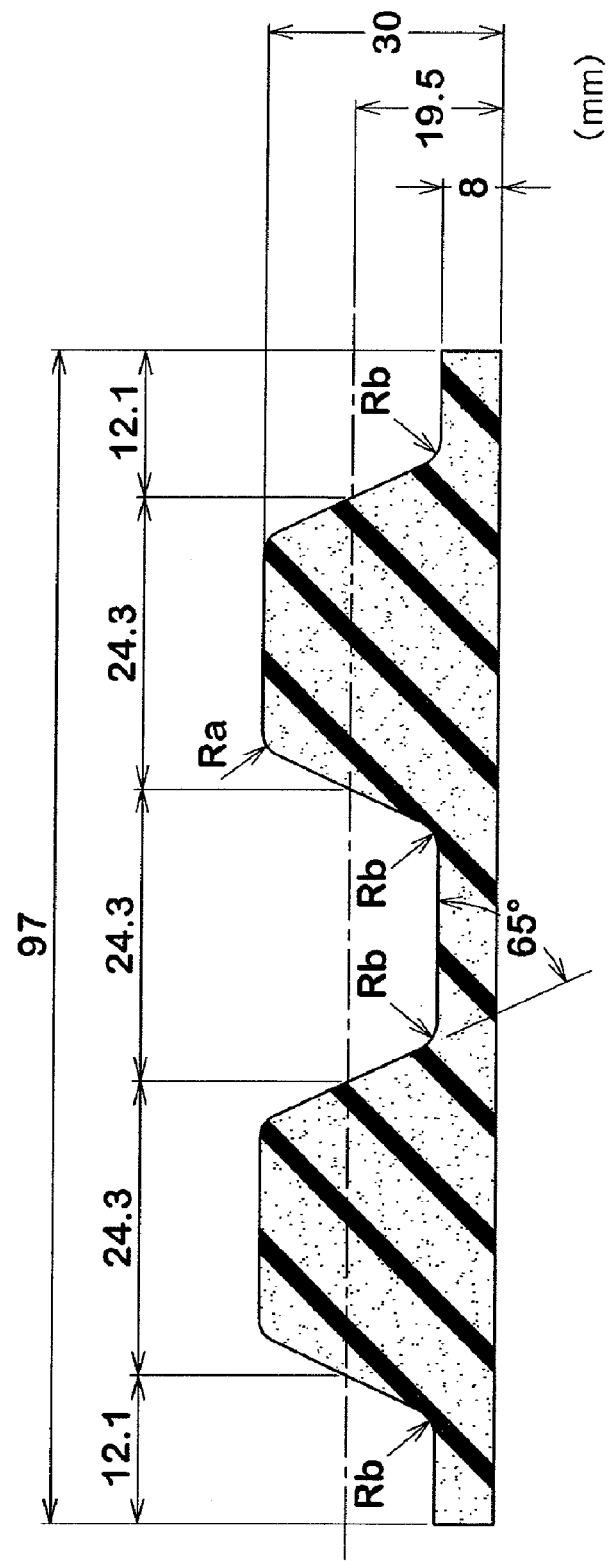
FIG. 9 is a sectional view showing a cross section shape and size of a noise damper used in a test.
Figure 10:
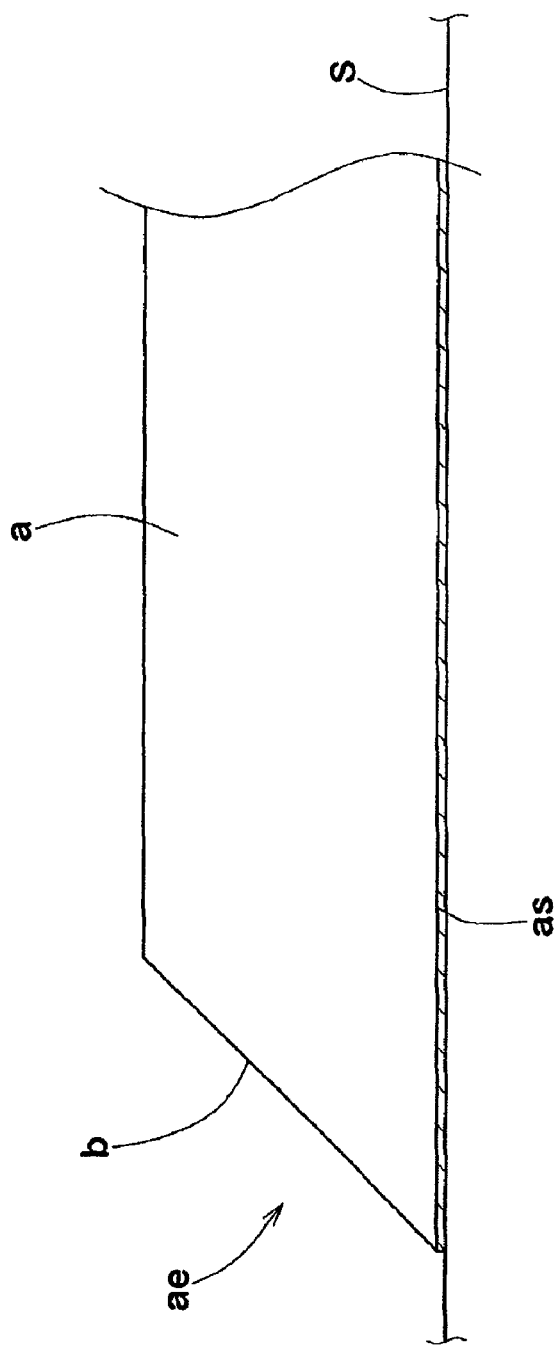
FIG. 10 is a sectional view showing an inclined surface portion of a conventional noise damper.

Noise dampers 4 having double-faced tapes 11 which have cross section size shown in FIG. 9 and in which both outer ends 4E in the circumferential direction are formed with inclined surface portions 30 having specification shown in Table 1 were prototyped.

A hundred noise dampers 4 were prototyped, and five of them were arranged in two stages as one unit. Ten units were packed in boxes of inner size (width of 540 mm×height of 335 mm×length of 1990 mm), and they were transported from Aichi prefecture to Fukushima prefecture. The noise dampers 4 are carried such that their longitudinal direction intersects with a moving direction of the truck.

The noise dampers 4 after transportation were checked, the noise damper from which the peeling off paper is peeled off in the tip end P of the inclined surface portion 30 was evaluated as a damaged product, and the generating ratio of the damaged product was compared.

Each of the noise dampers 4 which was not damaged was adhered to a tread inner surface 3ti of a tire (tire size of 215/45R17), and a drum durability test was carried out.

As the sponge material, ether-based polyurethane sponge having specific gravity of 0.039 (product No. ESH2) produced by INOAC CORPORATION was used.

A product (product No. 5000NS) produced by NITTO DENKO) was used as the double-faced tape.

Length of sponge was 1820 mm.

(2) Drum Durability Test

A drum having two projections (diameter of 1.7 m) was used. The drum is formed at its outer peripheral surface with two projections having a trapezoidal cross section (height of 15 mm, a lower bottom of 40 mm, an upper bottom of 20 mm).

A tire having a noise damper was allowed to run on the drum having the projections as far as 10,000 km under conditions of internal pressure (230 kPa), rim (17×7 JJ), load (6.2 kN: 1.2 times of maximum load defined in JATMA), speed (60 km/h).

Presence or absence of generation of a crack or damage in the outer end of the noise damper in the circumferential direction was checked at each 1,000 Km, and the entire running distance when crack or damage was generated was found.

As shown in Table 1, it can be confirmed that the assembly of the embodiment can suppress the generation of the crack or damage of the noise damper at the outer end in the circumferential direction of the tire while securing the road noise reducing effect, and can enhance the durability of the noise damper.

TABLE 1

| | Con. Exa | Com. Exa 1 | Emb. 1 | Emb. 2 | Emb. 3 | Emb. 4 | Emb. 5 | Emb. 6 | Emb. 7 |
|---|---|---|---|---|---|---|---|---|---|
| Inclined surface portion | | | | | | | | | |
| First inclined surface | ○ | ○ | ○ | ○ | ○ | ○ | ○ | ○ | ○ |
| Inclination angle θ1 (deg.) | 45 | 50 | 60 | 70 | 80 | 90 | 100 | 110 | 120 |
| Second inclined surface | X | ○ | ○ | ○ | ○ | ○ | ○ | ○ | ○ |
| Inclination angle θ2 (deg.) | — | 45 | 45 | 45 | 45 | 45 | 45 | 45 | 45 |
| Height h of Intersection Q (mm) | | 20.0 | 11.8 | 7.9 | 6.1 | 5.0 | 4.3 | 3.7 | 3.2 |
| Chamfered portion | X | X | X | X | X | X | X | X | X |
| Generating ratio of Damaged product (%) | 14.6 | 9.6 | 5.0 | 4.2 | 3.3 | 2.9 | 2.1 | 1.3 | 1.3 |
| Durability (Total running distance in Km) | 10000 | 10000 | 10000 | 10000 | 10000 | 10000 | 10000 | 10000 | 8000 |

| | Com. Exa 2 | Com. Exa 3 | Emb. 8 | Emb. 9 | Emb. 10 | Emb 11 | Emb 12 | Emb 13 | Emb 14 |
|---|---|---|---|---|---|---|---|---|---|
| Inclined surface portion | | | | | | | | | |
| First inclined surface | ○ | ○ | ○ | ○ | ○ | ○ | ○ | ○ | ○ |
| Inclination angle θ1 (deg.) | 130 | 140 | 90 | 90 | 90 | 90 | 90 | 90 | 90 |
| Second inclined surface | ○ | ○ | ○ | ○ | ○ | ○ | ○ | ○ | ○ |
| Inclination angle θ2 (deg.) | 45 | 45 | 45 | 45 | 45 | 45 | 45 | 45 | 45 |
| Height h of intersection Q (mm) | 2.7 | 2.3 | 3.0 | 6.0 | 9.0 | 12.0 | 15.0 | 18.0 | 20.0 |
| Chamfered portion | X | X | X | X | X | X | X | X | X |

TABLE 1-continued

| | | | | | | | | | |
|---|---|---|---|---|---|---|---|---|---|
| Generating ratio of Damaged product (%) | 1.3 | 0.8 | 4.2 | 2.9 | 2.5 | 1.3 | 0.4 | 0.0 | 0.0 |
| Durability (Total running distance in Km) | 3000 | 2000 | 10000 | 10000 | 10000 | 10000 | 8000 | 2000 | 2000 |

| | Emb 15 | Emb 16 | Emb 17 | Emb 18 | Emb 19 | Emb 20 | Emb 21 | Emb 22 | Emb 23 |
|---|---|---|---|---|---|---|---|---|---|
| Inclined surface portion | | | | | | | | | |
| First inclined surface | ◯ | ◯ | ◯ | ◯ | ◯ | ◯ | ◯ | ◯ | ◯ |
| Inclination angle θ1 (deg.) | 85 | 85 | 85 | 90 | 90 | 100 | 100 | 90 | 90 |
| Second inclined surface | ◯ | ◯ | ◯ | ◯ | ◯ | ◯ | ◯ | ◯ | ◯ |
| Inclination angle θ2 (deg.) | 45 | 45 | 45 | 60 | 60 | 45 | 45 | 45 | 45 |
| Height h of intersection Q (mm) | 5.5 | 11.0 | 15.3 | 8.7 | 13.9 | 4.3 | 8.5 | 5.0 | 5.0 |
| Chamfered portion | X | X | X | X | X | X | X | ◯ (5 × 5) | ◯ (R10) |
| Generating ratio of Damaged product (%) | 3.3 | 2.9 | 2.9 | 0.8 | 0.4 | 2.1 | 0.4 | 0.0 | 0.0 |
| Durability (Total running distance in Km) | 10000 | 10000 | 8000 | 10000 | 8000 | 10000 | 10000 | 10000 | 10000 |

In the Table 1, "Con. exa" means "Conventional Example", "Com. Exa" means "Comparative Example", and "Emb" means "Embodiment". And also, "◯" means Existence, and "X" means No Existence.

Example 2

Pneumatic tires having the noise dampers were prototyped based on the specification shown in Table 2.

Pneumatic tires having the noise dampers having substantially the same specification as that of the first embodiment were used.

Tire size: 215/45ZR17
width BW of belt layer: 166 mm
Air pressure: 230 kPa
Rim size: 17×7 JJ
Noise Damper Specification of corner of free surface is as shown in Table 2.

Length L in the circumferential direction of tire: 1840 mm
Both ends were cut at taper angle θ of 45 degrees and an end was cut with S=5 mm (FIG. 7(B)).

Fixing method: a long noise damper was curved along a tread region of a cavity surface of the tire and was pasted using a double-faced tape ("E700" produced by Ebisu-chemical. co)

The double-faced tape has the same size as that of the fixing surface of the noise damper.

The test method is as follows:
<Road Noise Performance>

The pneumatic tires having the noise dampers were assembled to the rims, and mounted on all wheels of a Japanese FF vehicle of 2000 cc.

The vehicle runs on a road noise measuring road (asphalt rough road) at 60 km/h.

Noise in the passenger room was collected by a microphone disposed at a position of an ear on the side of a driver's seat, and a sound pressure of a peak value of a columnar resonance sound around narrow-band 230 Hz was measured.

The evaluation is shown with an increase/decrease value while employing a comparative example as a reference.

Here, 0 (zero) means the same as the reference, and +(plus) means that the road noise is increased.
<Durability>

The vehicle was allowed to run on a drum (diameter of 1.7 m) as far as 2,000 km, 4,000 km, 6,000 km and 8,000 km, respectively. The drum is provided with two projections (height of 15 mm and width of 15 mm) which are separated from each other through 180 degrees.

Presence or absence of damage of the noise damper was visually checked.

A damaged noise damper is shown with X, and a no-damaged noise damper is shown with O.

After a noise damper was damaged, the test was discontinued.

Internal pressure: 230 kPa
Load: 6.2 kN (1.2 times of maximum value defined in JATMA)
Running speed: 80 km/h Results of the test are shown in Table 2.

As the results of the test, it was confirmed that the pneumatic tires having the noise dampers of the embodiments had both excellent road noise reducing effect and durability.

TABLE 2

| | Com. Exa 4 | Com. Exa 5 | Emb. 24 | Emb. 25 | Emb. 26 | Emb. 27 | Emb. 28 |
|---|---|---|---|---|---|---|---|
| Radius of curvature of Outer chamfered portion Ra (mm) | 0 (non-circular) | 1.5 | 2.0 | 4.0 | 6.0 | 4.0 | 3.0 |
| Radius of curvature of Inner chamfered portion Rb (mm) | 0 (non-circular) | 1.5 | 2.0 | 4.0 | 6.0 | 6.0 | 6.0 |
| Ratio(Ra/Rb) | — | 1.0 | 1.0 | 1.0 | 1.0 | 0.67 | 0.5 |
| Road Noise performance (dB) | base | +0.1 | +0.1 | +0.2 | +0.4 | −0.1 | −0.2 |
| Durability | | | | | | | |
| 2000 km | X | ◯ | ◯ | ◯ | ◯ | ◯ | ◯ |
| 4000 km | — | X | ◯ | ◯ | ◯ | ◯ | ◯ |
| 6000 km | — | — | X | ◯ | ◯ | ◯ | ◯ |
| 8000 km | — | — | — | X | ◯ | ◯ | ◯ |

What is claimed is:

1. An assembly of a pneumatic tire and a rim, comprising a noise damper in which a sponge material extending in a circumferential direction of the tire and having a volume V2 of 0.4 to 20% of entire volume V1 of a tire cavity formed by a rim and a pneumatic tire assembled to the rim is used in the cavity, wherein the noise damper comprises a fixing surface fixed to a surface which surrounds the tire cavity, and a free surface directed to the tire cavity, a maximum value of thickness from the fixing surface to the free surface is in a range of 5 to 50 mm, including a thick mountain portion and a thin valley portion, at least one of outer ends of the noise damper in the circumferential direction of the tire is formed into an inclined surface portion comprising a first inclined surface rising from the fixing surface and a second inclined surface extending from the first inclined surface to the free surface, an inclination angle θ1 formed between the first inclined surface and the fixing surface is in a range of 60 to 120 degrees, and an inclination angle θ2 formed between the second inclined surface and the fixing surface is in a range of 15 to 70 degrees and is smaller than the inclination angle θ1.

2. The assembly of the pneumatic tire and the rim according to claim 1, wherein a height h of a point of intersection between the first inclined surface and the second inclined surface from the fixing surface in a radial direction is in a range of 3 to 15 mm.

3. The assembly of the pneumatic tire and the rim according to claim 1, wherein an inclined surface portion of the noise damper is formed with a chamfered portion which cuts off an apex at which a side surface of the noise damper, the first inclined surface and the fixing surface intersect with each other.

4. The assembly of the pneumatic tire and the rim according to claim 1, wherein a double-faced tape is used as fixing means of the noise damper.

* * * * *